Nov. 5, 1957　　　R. H. SUEDA ET AL　　　2,812,141
CONTROL FOR MOTOR DRIVEN VENT
Filed Jan. 3, 1955　　　　　　　　　　　　　　　3 Sheets-Sheet 3
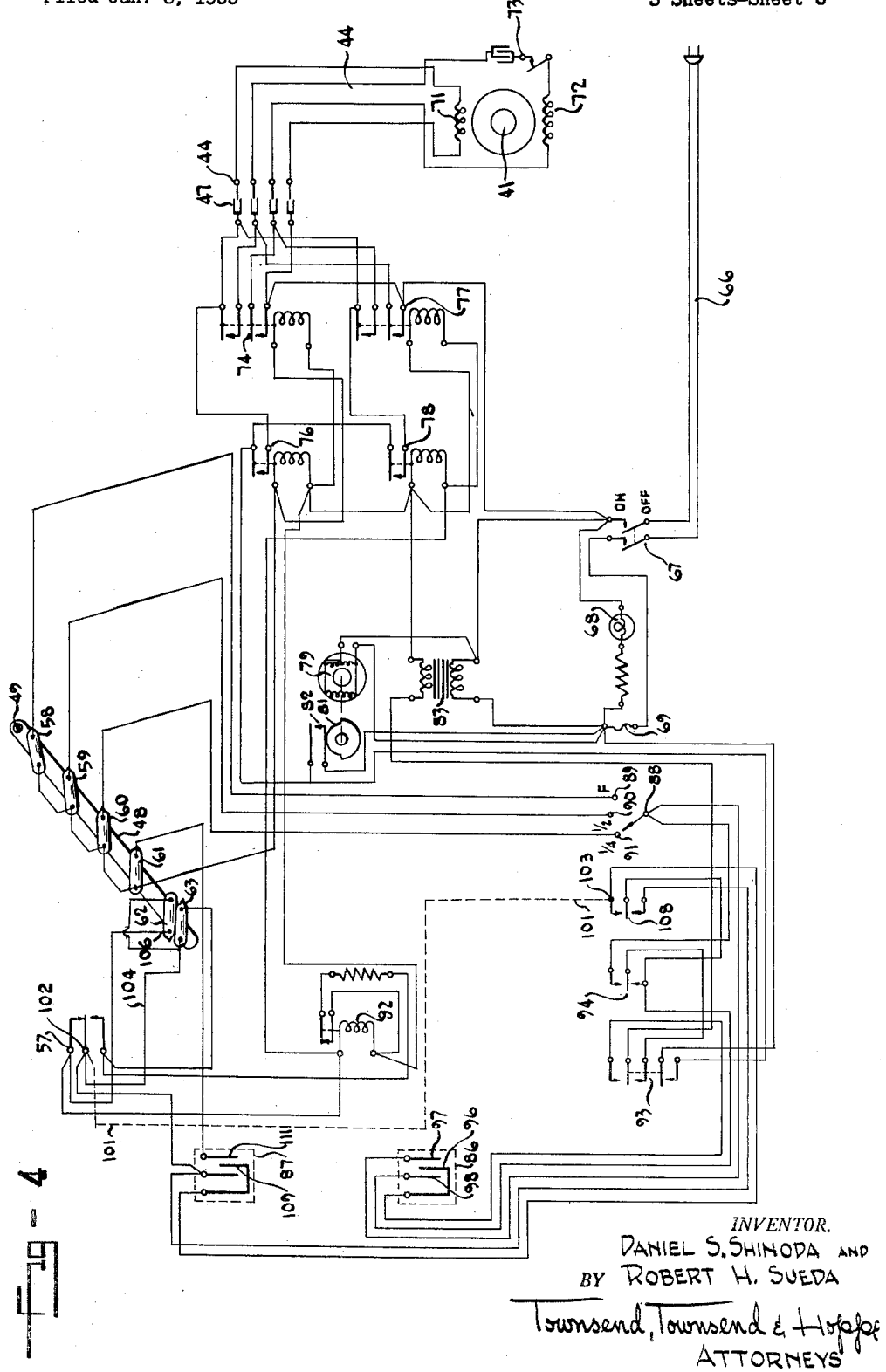
INVENTOR.
DANIEL S. SHINODA AND
BY ROBERT H. SUEDA
Townsend, Townsend & Hoppe
ATTORNEYS weekly# United States Patent Office 2,812,141
Patented Nov. 5, 1957

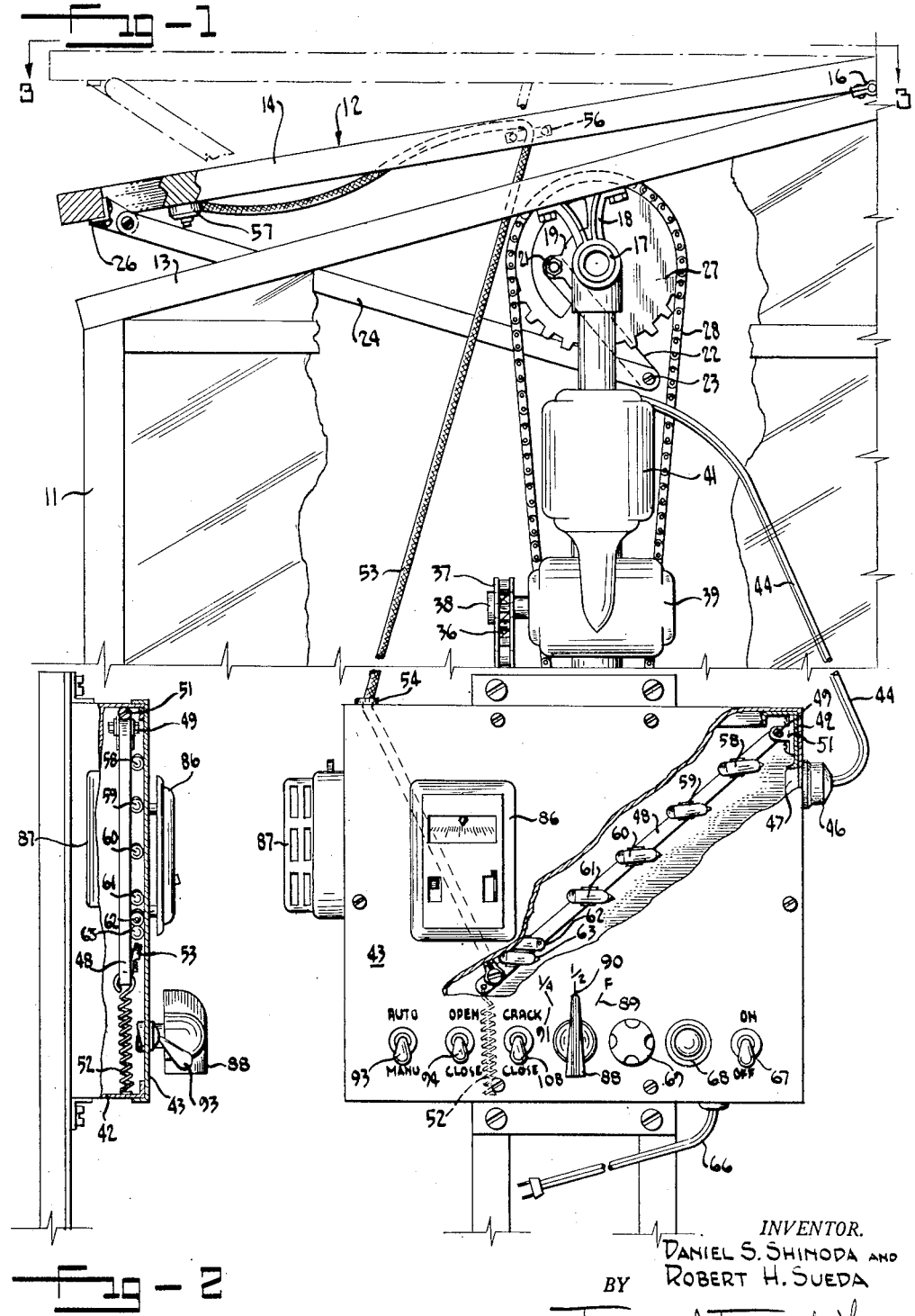

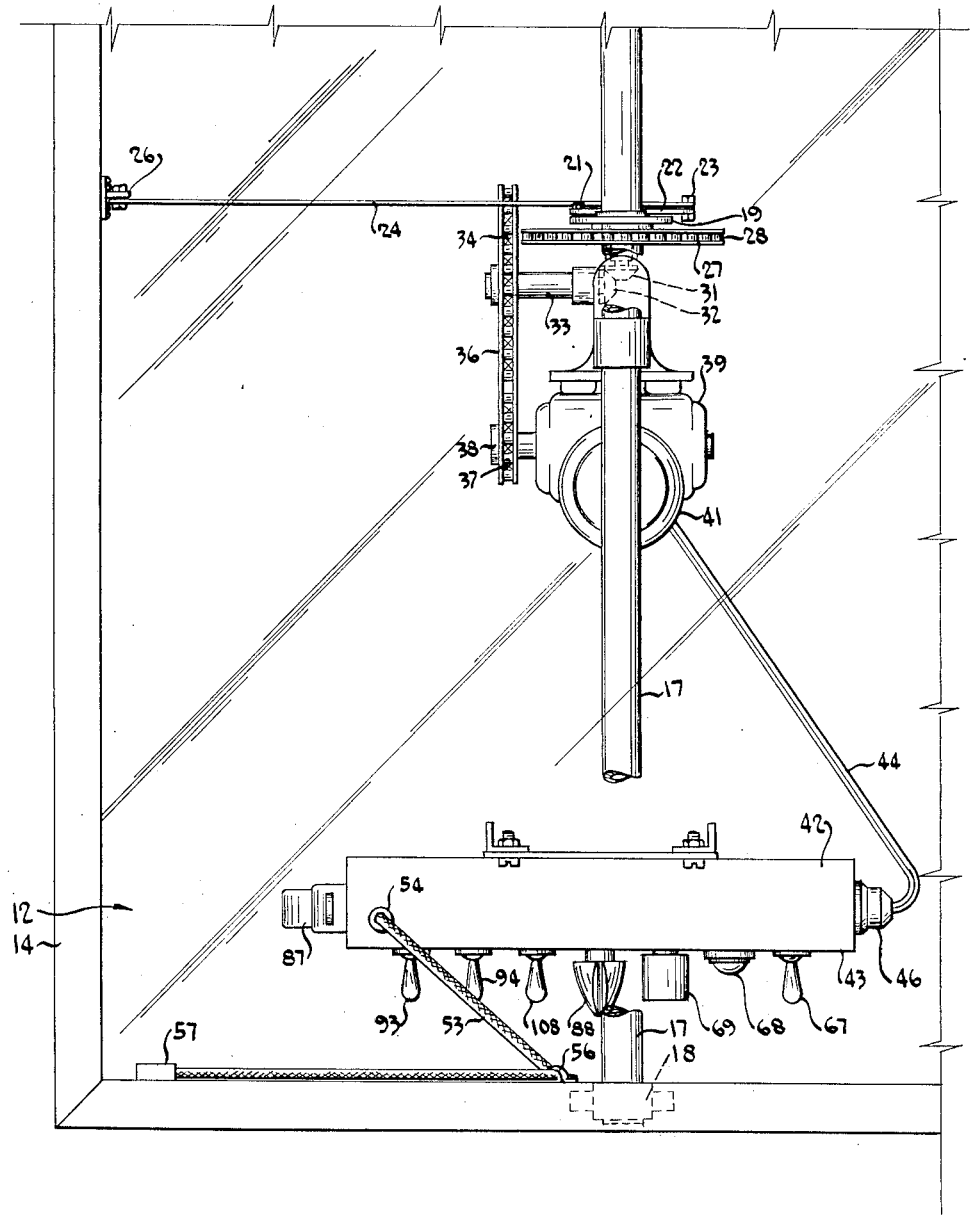

2,812,141
CONTROL FOR MOTOR DRIVEN VENT

Robert H. Sueda, Auburn, and Daniel S. Shinoda, Hayward, Calif., assignors to San Lorenzo Nursery Company, Inc., San Lorenzo, Calif., a corporation of California Application January 3, 1955, Serial No. 479,510

5 Claims. (Cl. 236—44)

This invention relates to a new and improved control for the vent of an enclosure such as a greenhouse wherein the vent is opened and closed responsive to changes in the temperature inside the enclosure. Further, the invention relates to the provision of a control for the vent which is responsive both to temperature and to humidity in the interior of the enclosure.

One of the important features of the invention is the provision of a control which can be set by the operator to limit the opening of the vent to a predetermined fraction of its total amount of opening regardless of the temperature or humidity inside the enclosure. This feature of the invention is desirable if the operator can determine from observation of outside atmospheric conditions, weather reports and the like, that winds, storms or the like are likely. By limiting the maximum amount of opening, the danger of gusts entering through the vent and creating drafts which might damage delicate plants is reduced. Further, the provision of means to limit the maximum opening of the vent assures that temperature changes will be gradual rather than abrupt. Many varieties of plants are seriously damaged by rapid temperature changes and accordingly by limiting the maximum vent opening, the period of time over which the enclosure is cooled is increased and the plants protected from such damage.

Another feature of the invention is the provision of an adjustment which limits the closing of the vent responsive to humidity changes so that it remains open a small amount or crack when the humidity rises even though the temperature is low. This feature of the invention is of particular importance when the control is operating during the night and reduces the likelihood of fungus disease damaging plants. The exterior temperature may be considerably below the temperature of the enclosure and below the desirable temperature for admission of air from the atmosphere. Nevertheless, during the night hours the humidity within the enclosure may increase to a great extent so that fungus disease may result. The provision of means for opening the vent a crack permits reduction in the humidity of the enclosure without the danger of large amounts of air unduly chilling the plants.

Another feature of the invention is the provision of a time control in the electric circuit which actuates the motor which opens and closes the vent, the time control automatically turning the motor off for a period of time to permit air to circulate through the enclosure before the vent is further opened or closed. Thus, assuming that the temperature within the enclosure rises to such a point that the vent must be opened, the motor which controls the vent opening is turned on in such direction as to open the vent. The time control permits the motor to run for a time interval of, for example, thirty seconds, and then stops the motor for another time interval. The delay permits air to circulate through the enclosure and equalize the temperature within the entire enclosure. At the end of the period of stoppage, if the temperature is still too high, the motor controlling the vent is then turned on for an additional time interval with a subsequent similar stoppage until the temperature is brought down to the desired point. The time delay feature, which operates both during opening and closing of the vent, while the controls are on automatic as distinguished from manual control, eliminates the constant opening and closing which might otherwise result.

Another feature of the invention is the provision of a switch which permits the operator manually to open or close the vent, irrespective of the setting of the thermostat or humidistat and also irrespective of the time delay described in the preceding paragraph. One example of the use of this control is when the greenhouse is being fumigated. At such time it is necessary to keep the vent closed for a period of time to permit the fumigation to be completed. After completion of the fumigation it is necessary to open the vent to clear the atmosphere irrespective of temperature.

Another feature of the invention is the provision of a limit switch on the vent which turns off the motor controlling the position of the vent when the vent is closed irrespective of the other controls hereinafter described.

One of the most important features of the invention is the use of a cord which extends from the vent to the control box and which alters the inclination of a switch carrying arm on which a series of switches is mounted. The individual switches are set to open and close at different inclinations of the vent and hence are utilized to control the amount of opening as hereinabove described. The cord which is connected to the switch arm may also carry the wires which are connected to the limit switch which turns off the motor when the vent is fully closed. Thus the cord performs a dual function which is both mechanical and electrical.

Other objects of the present invention will become apparent upon reading the following specification and referring to the accompanying drawings in which similar characters of reference represent corresponding parts in each of the several views.

In the drawings:

Fig. 1 is a side elevation view, partially broken away in section, of the device installed on a conventional greenhouse vent;

Fig. 2 is a side elevation of a control box partially broken away in section to reveal the interior switch arm;

Fig. 3 is a top plan of the structure of Fig. 1, and

Fig. 4 is a wiring diagram.

Small sections of a conventional florist's greenhouse are shown in Figs. 1 and 3 of the accompanying drawings. It will be understood that the details of construction of such greenhouses form no part of the present invention. To provide ventilation of such a greenhouse, a vent 12 is installed in the frame 13 opening of the roof, such a vent 12 also being conventional and, as illustrated herein, having a substantially rectangular frame 14 hinged to the supporting structure of the greenhouse by a horizontal hinge 16. Various means are conventionally employed to open and close such vents and the instant invention may be attached to existing conventional vent opening and closing mechanisms. The form of mechanism herein illustrated is installed on a horizontal stationary hollow shaft 17 supported by hangers 18 from the roof of the greenhouse. A rotatable annular disc 19 is mounted for rotation on shaft 17, disc 19 carrying a crank pin 21 which is connected to link 22, the opposite end of which is connected by pivot 23 to an extended lever 24, the outer end of which is pivotally connected to fitting 26 attached to the frame 14. Means (not shown) limit the rotative movement of the disc 19 to a fully opened and fully closed position. As is apparent and well understood in the art, as the disc 19 is caused to revolve in one direction or the other, the vent 12 is opened and closed. A means for rotating the disc 19 is the provision of a large sprocket 27, also rotatably mounted on the shaft 17 and connected for rotation with disc 19. Large sprocket 27 is connected by a roller chain 28 to a smaller sprocket 29 at a lower elevation. Various means may be employed to rotate the smaller sprocket 19 in conventional greenhouse structures, this function being performed by a handwheel (not shown) which may be used as an auxiliary means of opening and closing the vent in conjunction with the present invention or may be eliminated. Small sprocket 19 is attached to bevel gear 31 which meshes with beveled gear 32 on stub shaft 33. Large sprocket 34 is mounted on stub shaft 33 and is connected by roller chain 36 to small sprocket 37 on the shaft 38 of speed reduction box 39 of a reversible induction electric motor 41. The portions of the invention hereinafter described control the motor 41.

The electrical devices and circuits which control the motor 41 are contained in a control box 42 having a detachable front cover 43. Cord 44 which carries the leads of the motor 41 is connected into the control box 42 through plug 46 which meshes with a socket 47. Inside the control box 42 is an elongated switch carrying arm 48, the upper end of which is pivotally connected by means of pivot 49 to fitting 51 attached to the side of the control box 42. The outer end of arm 48 is connected to one end of helical spring 52 which biases the arm to downward position. A cable 53 is connected to the outer end of arm 48 and passes up and out through the sleeve 54 in the top of the box and extends up to the vent 12 and is fixed in position on the vent by means of fastener 56. The outer end of cable 53 is connected to double throw, single pole microswitch 57 on the lower surface of the frame 14 so located that when the vent 12 is fully closed, the microswitch 57 comes in contact with the frame 13 and throws the switch 57 from its normal position to a closed position. As is apparent from Fig. 1, as the vent 12 opens, cable 53 is lifted and this motion is transmitted to swing arm 48 upwardly about pivot 49. A plurality of mercury switches 58—63 is mounted on arm 48 at different angular positions relative to the horizontal. As the arm 48 swings upwardly, certain of the switches are opened and closed as hereinafter described in greater detail.

Turning now to the wiring diagram of Fig. 4, the alternating current input lines 66 are controlled by a double pole, single throw main switch 67. Pilot light 68 indicates whether the current is on and operating and fuse 69 in the line protects the equipment from overloading.

Running coil 71 and starting coil 72 of motor 41 and the conventional starting coil cutout mechanism 73 for reversible induction motor 41 are shown in the wiring diagram. As is conventional in such motors, the reversal of flow of current through the starting coil 72 changes the direction of rotation of the motor, but the flow through the running coil 71 is continuously in the same direction. Main opening relay 74 and safety opening relay 76 function to start the motor 41 by directing the current in the starting coil 72 in a direction which will open the vent 12. Main closing relay 77 and safety closing relay 78 function to start the motor 41 in the opposite direction. The energization of the coils of the respective relays 74—78 are controlled by various switches hereinafter described in detail.

Main power line 66 energizes continuously rotating timing switch motor 79 which turns at one revolution per minute. The shaft of motor 79 carries cam 81 which has a high dwell and a low dwell each occupying one-half the circumference of the cam. As cam 81 rotates, the high dwell closes microswitch 82 for one-half minute and then opens the switch for another half-minute. During the time when the switch 82 is closed, the motor 41 may be turned provided the coils of relays 74—76 or 77—78 are properly energized for opening or closing movement herein set forth. During the low dwell period, relays 74—78 are not energized. The main line 66 also energizes the primary coil of stepdown transformer 83. The low side of the transformer is used in the energization of the relays.

Thermostat 86 is mounted on the front of the control box 42 and is responsive to temperature conditions in the enclosure. The thermostat 86 has a conventional temperature control (not shown) so that any desired temperature may be preselected. Also mounted on the box 42 is a humidistat 87 which is responsive to the relative humidity conditions within the enclosure. Humidistat 87 may also be adjusted for the optimum humidity for the plants in the enclosure.

The switch carrying arm 48 and its pivot 49 are indicated in the wiring diagram on Fig. 4. As will be noted, there are six mercury switches 58—62 mounted in different positions and at different angles on arm 48. The full open switch 58 is closed at all times until the switch arm is rotated in clockwise direction to the position where the vent 12 is fully open (normally horizontal position of arm 48). As soon as the arm 48 reaches the latter position, the mercury switch 58 opens. Similarly, one-half open mercury switch 59 is closed at all positions until the switch arm 48 is at the angular portion corresponding to one-half open position of the vent 12. One-quarter switch 60 is closed at all times until the vent is one-quarter open.

On cover 43 is three-way switch 88. The terminals 89, 90 and 91 of said switch are connected respectively to one of the terminals of full switch 58, one-half switch 59 and one-quarter switch 60, respectively. Thus by turning the switch 88, any of the switch contacts 58—60 may be connected into the circuit as required by conditions of the atmosphere outside the enclosure according to the judgment of the operator.

Crack switch 61 opens as soon as the vent 12 has reached a position open a small amount. Switches 62 and 63 are substantially parallel to each other and placed in opposite directions. These switches are arranged so that when one switch is open, the other is closed. As arm 48 is lowered upon lowering of vent 12, switch 62 opens and this sets the circuit in such condition that, when microswitch 57 is closed, closing relay coils 77 and 78 are de-energized. As soon as vent 12 is closed, the contacts of relay 92 are closed and this sets the circuit so that when thermostat contacts 96 and 97 are closed, or when humidistat contacts 109 and 111 are closed, the circuit may be completed to energize opening relays 74 and 76. Relay 92 functions to insure that relays 74 and 76 are de-energized when relays 77 and 78 are energized.

Mounted on the front cover 43 is a double-pole, double-throw switch 93. When the switch 93 is in up position, the thermostat 86 and humidistat 87 control the operation of the vent 12 as hereinafter appears. However, when the switch 93 is in down position, the motor 41 is manually controlled through the instrumentality of open and close switch 94, likewise mounted on the front cover 43.

When the circuits are on manual control, the operator can open or close the vent 12 by proper manipulation of switch 94 irrespective of the setting of the thermostat or the humidistat and without interruption by time-control microswitch 82. Thus, assuming that it is desired to close the vent 12 (as, for example, for the purpose of fumigating the enclosure), the operator turns switch 93 to manual control and then turns switch 94 to "close" position. If the humidity is higher than the setting of the humidistat 87, then switch 108 must be in "close" position. This causes motor 41 to turn in the proper direction to close vent 12 until the vent is fully closed, whereupon microswitch 57 de-energizes the relays controlling the motor 41. Subsequently, when it is desired to open the vent 12, the operator turns switch 94 to open position and turns switch 88 to the proper terminal, depending upon the position of maximum opening desired. Thereupon the motor 41 is turned in proper direction to open the vent 12 until the desired amount of opening is reached, whereupon the relays 74 and 76 are de-energized by closing of one of the switches 58—60, depending upon the setting of switch 88.

Assuming that the switch 93 is in automatic position, the thermostat 86 is set to maintain the enclosure at a desired temperature. If the temperature exceeds the desired degree, contact 96 engages contact 97 of thermostat 86 and this energizes open relays 74 and 76 to rotate motor 41 in the proper direction so long as microswitch 82 is closed. At thirty-second intervals microswitch 82 breaks the circuit, and so long as the temperature is still above the desired temperature, relays 74 and 76 will be re-energized and motor 41 will be turned to open the vent 12. If the judgment of the operator so determines, switch 88 is set at one-quarter or one-half position rather than at full position and the relays 74 and 76 are de-energized as soon as the vent 12 has reached the proper position and one of the switches 58—60 has been opened.

Assuming that the temperature in the enclosure is below the desired temperature, the thermostat contact 96 engages contact 98 and this energizes the down relays 77 and 78 and causes the flow of current through the starting coil 72 in such direction that motor 41 turns in the proper direction to close the vent 12. The microswitch 82 interrupts the turning of the motor for thirty-second intervals as has previously been indicated. When the vent 12 reaches closed position, double-throw microswitch 57 de-energizes the closing relays 77 and 78.

Humidistat 87 is optional equipment. If the humidistat is not used, a jumper 101 is connected in the wiring circuit from point 102 to point 103 and wire 104 which runs between contact 102 and contact 106, is removed. However, when the humidistat 87 is in operation, humidistat 87 will cause the vent 12 to open when the humidity inside the enclosure is too high. However, one of the features of the invention is the provision of means to open the vent 12 to crack position when the humidity is too high, even though the temperature in the enclosure is not too high. When this condition prevails, the operator sets switch 108 at crack. Thereupon humidistat 87, when conditions are too humid, causes contacts 109 and 111 to engage, and this causes vent 12 to open. When the switch carrying arm 48 swings up to the crack position, mercury switch 61 opens, which then de-energizes the opening relays 74 and 76 as is apparent from the wiring diagram. If it is not desired to use the humidistat, switch 108 is set to closed position.

Although the foregoing invention has been described in some detail by way of illustration and example for purposes of clarity of understanding, it is understood that certain changes and modifications may be practiced within the spirit of the invention and scope of the appended claims.

What is claimed is:

1. A vent control comprising an enclosure, a vent for said enclosure, means hingedly mounting said vent, an electric motor, means for opening and closing said vent upon turning said motor, and control means for said motor comprising an electric circuit for said motor, a thermostat, a control arm, means connecting said vent and said control arm to adjust the position of said control arm responsive to the position of said vent, a horizontal pivot for said control arm, a cable connecting said vent and said control arm to swing said control arm about said pivot as said vent moves, a mercury switch mounted on said control arm to open when said vent is open beyond a predetermined amount and closed when said vent is open less than said predetermined amount, and a limit switch mounted on said vent responsive to break the current to interrupt closing of said vent when said vent is in closed position and in which said cable includes wire for said limit switch.

2. A vent control comprising an enclosure, a vent for said enclosure, means hingedly mounting said vent, an electric motor, means for opening and closing said vent upon turning said motor, and control means for said motor comprising an electric circuit for said motor, a thermostat, a control arm, means connecting said vent and said control arm to adjust the position of said control arm responsive to the position of said vent, switch means on said control arm, said switch means opening said circuit when said vent is open to a pre-determined amount, relay means responsive to said thermostat to close said vent upon the temperature falling below a selected point and to close said circuit to open said vent when said switch is closed and upon the temperature rising above a selected point, said switch means comprising a plurality of switches each opening when said vent opens to a different position and being closed when said vent opens less than said amount, a manual selector switch rendering one of said plurality of switches operative and the others inoperative, a horizontal pivot for said control arm, a cable connecting said vent and said control arm to swing said control arm about said pivot as said vent moves, and wherein said switch means comprises as least one mercury switch mounted on said control arm located at an angle to open when said vent is opened beyond a predetermined amount and closed when said vent is opened less than predetermined amount, and a limit switch mounted on said vent responsive to break the current to interrupt closing of said vent when said vent is in closed position and in which said cable includes wires for said limit switch.

3. A vent control comprising an enclosure, a vent for said enclosure, means hingedly mounting said vent, an electric motor, means for opening and closing said vent upon turning said motor, and control means for said motor comprising an electric circuit for said motor, a thermostat, a control arm, means connecting said vent and said control arm to adjust the position of said control arm responsive to the position of said vent, switch means on said control arm, said switch means opening said circuit when said vent is opened to a predetermined amount, relay means responsive to said thermostat to close said vent upon the temperature falling below a selected point and to close said circuit to open said vent when said switch is closed and upon the temperature rising above a selected point, said switch means comprising a plurality of switches each opening when said vent opens to a different position and being closed when said vent opens less than said amount, a manual selector switch rendering one of said plurality of switches operative and the others inoperative, a humidistat, relay means responsive to said thermostat to close said circuit and to open said vent upon the humidity rising above a selected point, and crack switch means on said control arm operable on opening of said vent to open said circuit and in which said circuit includes a manual crack switch operable when in one position to close said circuit to energize said motor to open said vent when said thermostat does not close said circuit, said crack switch limiting opening of said vent.

4. A vent control comprising an enclosure, a vent for said enclosure, means hingedly mounting said vent, an electric motor, means for opening and closing said vent upon turning said motor, and control means for said motor comprising an electric circuit for said motor, a thermostat, a control arm, means connecting said vent and said control arm to adjust the position of said control arm responsive to the position of said vent, switch means on said control arm, said switch means opening said circuit when said vent is open to a predetermined amount, relay means responsive to said thermostat to close said vent upon the temperature falling below a selected point and to close said circuit to open said vent when said switch is closed and upon the temperature rising above a selected point, said switch means comprising a plurality of switches each opening when said vent opens to a different position and being closed when said vent opens less than said amount, a manual selector switch rendering one of said plurality of switches operative and the others inoperative, a horizontal pivot for said control arm, a cable connecting said vent and said control arm to swing said control arm about pivot as said vent moves, and wherein said switch means comprises at least one mercury switch mounted on said control arm located at an angle to open when said vent is opened beyond a predetermined amount and closed when said vent is opened less than a predetermined amount, a humidistat, a mercury crack switch mounted on said control arm located at an angle to open when said vent is opened beyond a predetermined crack and closed when said vent is open less than said crack, a manual crack switch operable when in one position to connect said mercury crack switch into said circuit, said circuit being arranged when said manual crack switch is in said one position to open said vent upon actuation of said humidistat upon the humidity rising when the temperature is lower than the setting of said thermostat, said mercury crack switch being operable to open said circuit when said vent opens said predetermined crack.

5. A vent control according to claim 1 which further comprises a humidistat, a mercury crack switch mounted on said control arm located at an angle to open when said vent is opened beyond a predetermined crack and closed when said vent is open less than said crack, and a manual crack switch operable when in one position to connect said mercury crack switch into said circuit, said circuit being arranged when said manual crack switch is in said one position to open said vent upon actuation of said humidistat upon the humidity rising when the temperature is lower than the setting of said thermostat, said mercury crack switch being operable to open said circuit when said vent opens said predetermined crack.

References Cited in the file of this patent
UNITED STATES PATENTS

| | | |
|---|---|---|
| 1,043,616 | Mailloux | Nov. 5, 1912 |
| 1,820,764 | Abt | Aug. 25, 1931 |
| 1,962,884 | Wagner | June 12, 1934 |
| 2,522,222 | Haller | Sept. 12, 1950 |
| 2,580,122 | Parker | Dec. 25, 1951 |
| 2,584,691 | Galeazi | Feb. 5, 1952 |